(12) United States Patent
Kitchens et al.

(10) Patent No.: US 11,017,195 B2
(45) Date of Patent: May 25, 2021

(54) ULTRASONIC FINGERPRINT SCANNING BY MEANS OF PHOTOACOUSTIC EXCITATION

(71) Applicant: QUALCOMM Incorporated, San Diego, CA (US)

(72) Inventors: Jack Conway Kitchens, Buffalo, NY (US); John Keith Schneider, Williamsville, NY (US); Stephen Michael Gojevic, Lockport, NY (US); Evan Michael Breloff, Kenmore, NY (US); Emily Kathryn Brooks, Buffalo, NY (US); Alexei Stoianov, Toronto (CA); Fitzgerald John Archibald, Toronto (CA); James Anthony Miranto, Kenmore, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/454,550

(22) Filed: Jun. 27, 2019

(65) Prior Publication Data

US 2020/0410190 A1 Dec. 31, 2020

(51) Int. Cl.
*G06K 9/00* (2006.01)
*G06F 3/042* (2006.01)
*G06F 3/041* (2006.01)
*G06K 9/20* (2006.01)
*G06F 21/32* (2013.01)

(52) U.S. Cl.
CPC ......... *G06K 9/0002* (2013.01); *G06F 3/0412* (2013.01); *G06F 3/0421* (2013.01); *G06K 9/0004* (2013.01); *G06K 9/00046* (2013.01); *G06K 9/2018* (2013.01); *G06F 21/32* (2013.01)

(58) Field of Classification Search
CPC ............... G06K 9/0002; G06K 9/0004; G06K 9/00046; G06K 9/2018; G06K 2009/0006; G06F 3/0412; G06F 3/0421; G06F 21/32
See application file for complete search history.

(56) References Cited

U.S. PATENT DOCUMENTS

| 2012/0062364 A1* | 3/2012 | Rowe ................. G06K 9/0004 340/5.82 |
| 2015/0022670 A1* | 1/2015 | Gozzini ............. G06K 9/0002 348/187 |
| 2017/0323131 A1* | 11/2017 | Lu ........................ G01N 29/14 |
| 2019/0231198 A1* | 8/2019 | Hirota .................... A61B 8/13 |

\* cited by examiner

*Primary Examiner* — Stephen G Sherman
(74) *Attorney, Agent, or Firm* — Holland & Hart LLP

(57) ABSTRACT

The described techniques support a sensing scheme for electromagnetic excitation in ultrasonic imaging sensors. A biological tissue may be sensed and imaged using an electromagnetic excitation process to generate ultrasonic waves, such as, within the tissue. A component of a device may generate one or more pulses of electromagnetic waves, which may encounter and enter the biological tissue. In some examples, the component may be a display interface or may be different from a display interface of the device. The electromagnetic waves may excite the biological tissue and generate ultrasonic waves via expansion and contraction of the tissue upon heating. The ultrasonic waves may propagate within the biological tissue and may be sensed by an ultrasonic receiver array. The sensed ultrasonic waves may be converted to pixel image data of a biometric image and may be used for biometric authentication.

19 Claims, 7 Drawing Sheets

ULTRASONIC FINGERPRINT SCANNING BY MEANS OF PHOTOACOUSTIC EXCITATION

BACKGROUND

Some devices may support biometric identification methods, for example, fingerprint identification. These methods may relate to capturing an image of an individual's finger and to whether a pattern of ridges and valleys in the fingerprint image match a pattern. Some challenges, among others, of these methods include fingerprint identification when ridges or valleys of the individual's finger are worn, unclear, or damaged. Additionally, these methods may be susceptible to an individual attempting, for example, to deceptively defeat the biometric identification and verification

SUMMARY

Some examples of a device, such as a smartphone, may support biometric authentication schemes, for example, for user access. In the context of a fingerprint imager, an ultrasonic wave may propagate through a surface of the smartphone on which a person's finger may be placed to obtain a fingerprint image. After passing through the surface, some portions of the wave may encounter skin that is in contact with the surface (e.g., fingerprint ridges), while other portions of the ultrasonic wave encounter air (e.g., valleys between adjacent ridges of a fingerprint) and may be reflected with different intensities back toward the ultrasonic fingerprint imager. The reflected signals associated with the finger may be processed and converted to a digital value representing the signal strength of the reflected signal. When multiple reflected signals are collected over a distributed area, the digital values of such signals may be used to produce a representation, such as a graphical representation, of the signal strength over the distributed area (e.g., by converting the digital values to an image), thereby producing an image of the fingerprint.

Examples of imaging sensors, such as ultrasonic imaging sensors, are deployed in devices, and more specifically in various applications, such as fingerprint recognition. In fingerprint recognition applications, an ultrasonic imaging sensor having an array of transducer components may determine ridges and valleys of a fingerprint by capturing signals (for example in response to a time-varying excitation voltage) and determining the differences in signal amplitudes between the ridges and valleys. In some examples, an acoustic ensonification process used to generate ultrasonic waves (also referred to herein as ultrasonic signals) for an ultrasonic imaging sensor may be high in power consumption. New techniques for creating ultrasonic waves may be desired.

A finger may be sensed and imaged using an electromagnetic excitation process to generate ultrasonic waves within the finger. A light emitting source of a device may generate one or more pulses of electromagnetic waves (e.g., light waves, radio waves, infrared waves, ultraviolet waves, etc.), which may enter the finger. In some examples, the light emitting source may be separate from a display interface of the device. For example, the light emitting source may be a standalone light emitting source (e.g., a laser, a light emitting diode (LED), a portable light emitting source (e.g., portable LED source), or a light emitting source associated with another device. The photons of the electromagnetic waves may excite (e.g., via photothermal interaction) biological tissue within the finger and generate ultrasonic waves. The ultrasonic waves may propagate within the biological tissue and may be sensed by an ultrasonic receiver array of the device. The ultrasonic waves may be converted to pixel image data of a fingerprint image and may be output by the device and used for biometric authentication.

A method of biometric imaging at a device is described. The method may include generating, via a light emitting source of the device, one or more pulses of electromagnetic radiation waves, where the light emitting source is separate from a display interface of the device, emitting, via the light emitting source, the one or more pulses of electromagnetic radiation waves to generate one or more ultrasonic signals associated with one or more biological tissues of a finger, sensing, via an ultrasonic receiver array of the device, the one or more generated ultrasonic signals based on emitting the one or more pulses of electromagnetic radiation waves, generating a fingerprint image including at least one of ridges or valleys associated with the finger based on the sensing, and outputting a representation of the fingerprint image.

An apparatus for biometric imaging at a device is described. The apparatus may include a processor, memory coupled with the processor, and instructions stored in the memory. The instructions may be executable by the processor to cause the apparatus to generate, via a light emitting source of the device, one or more pulses of electromagnetic radiation waves, where the light emitting source is separate from a display interface of the device, emit, via the light emitting source, the one or more pulses of electromagnetic radiation waves to generate one or more ultrasonic signals associated with one or more biological tissues of a finger, sense, via an ultrasonic receiver array of the device, the one or more generated ultrasonic signals based on emitting the one or more pulses of electromagnetic radiation waves, generate a fingerprint image including at least one of ridges or valleys associated with the finger based on the sensing, and output a representation of the fingerprint image.

Another apparatus for biometric imaging at a device is described. The apparatus may include means for generating, via a light emitting source of the device, one or more pulses of electromagnetic radiation waves, where the light emitting source is separate from a display interface of the device, emitting, via the light emitting source, the one or more pulses of electromagnetic radiation waves to generate one or more ultrasonic signals associated with one or more biological tissues of a finger, sensing, via an ultrasonic receiver array of the device, the one or more generated ultrasonic signals based on emitting the one or more pulses of electromagnetic radiation waves, generating a fingerprint image including at least one of ridges or valleys associated with the finger based on the sensing, and outputting a representation of the fingerprint image.

A non-transitory computer-readable medium storing code for biometric imaging at a device is described. The code may include instructions executable by a processor to generate, via a light emitting source of the device, one or more pulses of electromagnetic radiation waves, where the light emitting source is separate from a display interface of the device, emit, via the light emitting source, the one or more pulses of electromagnetic radiation waves to generate one or more ultrasonic signals associated with one or more biological tissues of a finger, sense, via an ultrasonic receiver array of the device, the one or more generated ultrasonic signals based on emitting the one or more pulses of electromagnetic radiation waves, generate a fingerprint image including at least one of ridges or valleys associated with the finger based on the sensing, and output a representation of the fingerprint image.

In some examples of the method, apparatuses, and non-transitory computer-readable medium described herein, emitting, via the light emitting source of the device, the one or more pulses of electromagnetic radiation waves may include operations, features, means, or instructions for emitting the one or more pulses of electromagnetic radiation waves from the light emitting source of the device that may be external to a footprint of the display interface.

In some examples of the method, apparatuses, and non-transitory computer-readable medium described herein, emitting, via the light emitting source of the device, the one or more pulses of electromagnetic radiation waves may include operations, features, means, or instructions for emitting the one or more pulses of electromagnetic radiation waves from the light emitting source that may be external to a footprint of the device.

In some examples of the method, apparatuses, and non-transitory computer-readable medium described herein, sensing, via the ultrasonic receiver array of the device, the one or more generated ultrasonic signals may include operations, features, means, or instructions for sensing, via the ultrasonic receiver array of the device, the one or more generated ultrasonic signals across one or more of an axial plane, a coronal plane, or a sagittal plane associated with the finger, where the fingerprint image includes a tomographic fingerprint image based on sensing the one or more generated ultrasonic signals across one or more of the axial plane, the coronal plane, or the sagittal plane associated with the finger.

In some examples of the method, apparatuses, and non-transitory computer-readable medium described herein, sensing, via the ultrasonic receiver array of the device, the one or more generated ultrasonic signals may include operations, features, means, or instructions for sensing, via a piezoelectric micromachined ultrasonic transducer (PMUT) of the device, the one or more generated ultrasonic signals.

In some examples of the method, apparatuses, and non-transitory computer-readable medium described herein, sensing, via the ultrasonic receiver array of the device, the one or more generated ultrasonic signals may include operations, features, means, or instructions for sensing, via a capacitive micromachined ultrasonic transducer (CMUT) of the device, the one or more generated ultrasonic signals.

In some examples of the method, apparatuses, and non-transitory computer-readable medium described herein, the ultrasonic receiver array of the device may include operations, features, means, or instructions for converting the one or more generated ultrasonic signals to one or more pixels based on one or more pixel elements of the array of pixels elements, where generating the fingerprint image may be further based on the converting.

Some examples of the method, apparatuses, and non-transitory computer-readable medium described herein may further include operations, features, means, or instructions for selecting one or more wavelengths of the one or more pulses of electromagnetic radiation waves based on a target depth level associated with the one or more biological tissues of the finger to stimulate the one or more biological tissues of the finger to generate the one or more ultrasonic signals, where emitting, via the light emitting source of the device, the one or more pulses of electromagnetic radiation waves may be further based on the one or more wavelengths.

In some examples of the method, apparatuses, and non-transitory computer-readable medium described herein, the one or more wavelengths may be within one or more of a radio spectrum of an electromagnetic spectrum, a microwave spectrum of the electromagnetic spectrum, a near-infrared spectrum of the electromagnetic spectrum, an infrared spectrum of the electromagnetic spectrum, a visible spectrum of the electromagnetic spectrum, or an ultraviolet spectrum of the electromagnetic spectrum.

In some examples of the method, apparatuses, and non-transitory computer-readable medium described herein, the ridges associated with the finger reflect the one or more generated ultrasonic signals, and the valleys associated with the finger absorb or alter the one or more generated ultrasonic signals.

In some examples of the method, apparatuses, and non-transitory computer-readable medium described herein, outputting the representation of the fingerprint image may include operations, features, means, or instructions for outputting, via the display interface of the device, the representation of the fingerprint image, where the display interface includes an organic light emitting diode (OLED) display interface.

In some examples of the method, apparatuses, and non-transitory computer-readable medium described herein, the light emitting source includes one or more of a light emitting diode (LED), a laser, or an OLED display interface.

In some examples of the method, apparatuses, and non-transitory computer-readable medium described herein, the one or more ultrasonic signals may be generated by the one or more biological tissues within the finger based on the one or more pulses of electromagnetic radiation waves.

DETAILED DESCRIPTION

Figure 1:
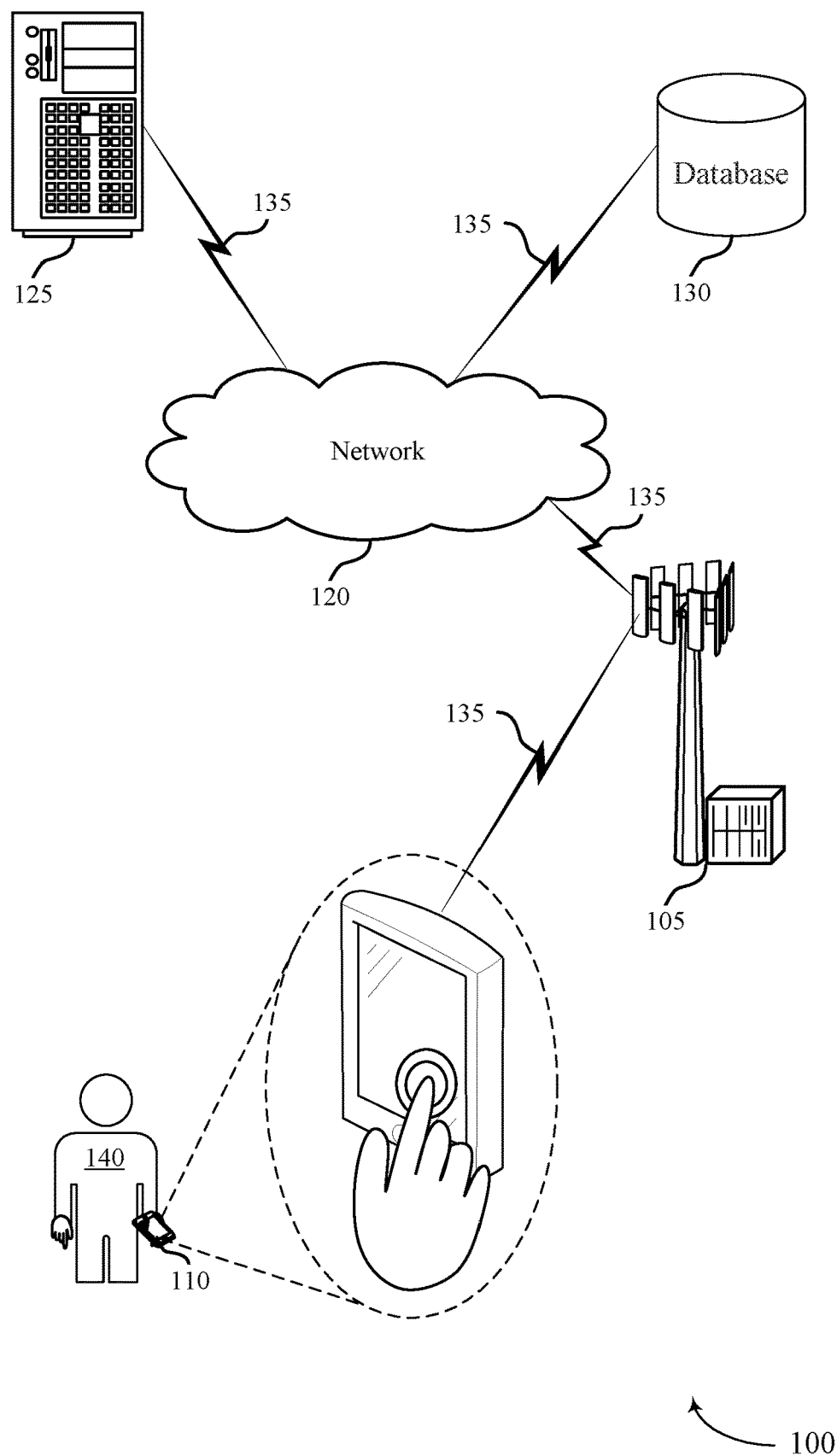
FIG. 1 illustrates an example of a system for biometric imaging at a device that supports ultrasonic fingerprint scanning by means of photoacoustic excitation in accordance with aspects of the present disclosure.

Authentication data (e.g., such as usernames, passwords, biometric traits) is being increasingly used to control access to resources (e.g., such as computer and email accounts, mobile device access) and to prevent unauthorized access to important information or data stored in such accounts or devices. Biometric authentication techniques may provide for robust security due to, for example, the inherent universality, uniqueness, and permanence of certain biometric traits. For example, a device (e.g., computer, mobile device) may utilize biometric authentication techniques for user access. In the context of an ultrasonic fingerprint imager, as an example, an ultrasonic wave may travel through a surface on which a person's finger may be placed to obtain a fingerprint image. After passing through the surface, some portions of the ultrasonic wave may encounter skin that is in contact with the surface (e.g., fingerprint ridges), while other portions of the ultrasonic wave may encounter air (e.g., valleys between adjacent ridges of a fingerprint) and may be reflected with different intensities (e.g., back toward) the ultrasonic sensor.

The reflected signals associated with the finger may be processed and converted to a digital value representing the signal strength of the reflected signal. When multiple reflected signals are collected (e.g., over a distributed area), the digital values of such signals may be used to produce a representation, such as a graphical representation, of the signal strength over the distributed area (e.g., by converting the digital values to an image), thereby producing an image of the fingerprint. Thus, an ultrasonic sensor system may be used as a fingerprint sensor or other type of biometric sensor. In some cases, transmitting ultrasonic waves into a finger (e.g., or other biological tissue) may consume high amounts of power.

Accordingly, a biological tissue (e.g., finger, eye, etc.) may be sensed and imaged using an electromagnetic excitation process to generate ultrasonic waves. A radiation component of a device (also referred to as a light emitting source) may generate one or more pulses of electromagnetic waves (e.g., light waves, radio waves, infrared waves, ultraviolet waves, etc.), which may encounter the biological tissue and enter the biological tissue. The photons of the electromagnetic waves may excite (e.g., via photothermal interaction) the biological tissue and generate ultrasonic waves. The ultrasonic waves may propagate within the biological tissue and may be sensed by an ultrasonic sensor (e.g., an ultrasonic receiver array). The ultrasonic waves may be converted to pixel image data (e.g., a fingerprint image, retinal scan, etc.) and may be used for biometric authentication.

The electromagnetic waves may include radio frequency energy, green light, visible light, microwaves, near-infrared waves, infrared waves, and/or ultraviolet waves created by the one or more electromagnetic radiation components (e.g., a source). In some cases, the source of electromagnetic waves may be a display, such as a device display. Additionally or alternatively, the source of electromagnetic waves may be separate from a device display or may be external to the device. In some examples, the wavelength of the electromagnetic waves may determine a depth of penetration into the biological tissue. Accordingly, the wavelength of the electromagnetic waves may be selected based on a target depth of penetration into biological tissue (e.g., based on the portions of the biological tissue that are being imaged).

Aspects of the disclosure are initially described in the context of a system for ultrasonic imaging sensors. An example sensing scheme and example sensing modes are then described. Aspects of the disclosure are further illustrated by and described with reference to apparatus diagrams, system diagrams, and flowcharts that relate to ultrasonic fingerprint scanning by means of photoacoustic excitation.

FIG. 1 illustrates an example of a system 100 that supports ultrasonic fingerprint scanning by means of photoacoustic excitation in accordance with aspects of the present disclosure. In some examples, the system 100 may be a wireless communications system that may be a multiple-access wireless communications system, for example, such as a fourth generation (4G) systems such as Long Term Evolution (LTE) systems, LTE-Advanced (LTE-A) systems, or LTE-A Pro systems, and fifth generation (5G) systems which may be referred to as New Radio (NR) systems, as well as wireless local area networks (WLAN), such as Wi-Fi (i.e., Institute of Electrical and Electronics Engineers (IEEE) 802.11) and Bluetooth-related technology. The system 100 may include a base station 105, a device 110, a server 125, and a database 130. In some examples, the system 100 may also include a user 140, and the device 110 may employ sensing techniques with the user 140. For example, the device 110 may employ biometric sensing techniques (e.g., ultrasonic imaging processing) for the user 140 to sense and image a fingerprint of the user 140. The aspects of the system 100 are solely for exemplary purposes, and are not intended to be limiting in terms of the applicability of the described techniques. That is, the techniques described herein may be implemented in, or applicable to, other examples of biometric scanning, without departing from the scope of the present disclosure. For example, the described ultrasonic imaging sensor and associated biometric sensing techniques may be applied for scanning of other biometric traits (e.g., such as an eyeball or retina, a face, etc.).

The device 110 may be referred to as a mobile device, a wireless device, a remote device, a handheld device, a subscriber device, an authentication device, a biometric sensing device, a scanning device, or some other suitable terminology. A device 110 may also be a personal electronic device such as a cellular phone, a personal digital assistant (PDA), a tablet computer, a laptop computer, a personal computer, a display device (e.g., any device with a display or screen), etc. In some examples, the device 110 may also be referred to as an Internet of Things (IoT) device, an Internet of Everything (IoE) device, a machine type communication (MTC) device, a peer-to-peer (P2P) device, or the like, which may be implemented in various articles such as appliances, vehicles, meters, or the like. Further examples of device 110 that may implement one or more aspects of ultrasonic biometric sensors and associated techniques may include Bluetooth devices, personal data assistants (PDAs), wireless electronic mail receivers, hand-held or portable computers, netbooks, notebooks, printers, copiers, scanners, cash machines, facsimile devices, GPS receivers/navigators, cameras, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, and projectors, and the like.

Any of such device 110 may include a sensor, for example, an ultrasonic imaging sensor (also referred to herein as an ultrasonic biometric sensor, or simply an ultrasonic sensor) configurable (or configured with) piezoelectric micromachined ultrasonic transducers (PMUTs), capacitive micromachined ultrasonic transducers (CMUTs), or the like. The ultrasonic imaging sensor may be configured to determine ridges and valleys of a fingerprint of the user 140.

In some examples, a PMUT of the device 110 may be a 3-port PMUT. In some examples, the PMUT may include a layer of piezo-sensitive material (e.g., such as a continuous copolymer) between an electrode array and a common electrode (e.g., a reference electrode). The PMUT operation may be based on a flexural motion (e.g., bending) of a thin membrane coupled with a thin piezoelectric film (e.g., piezo-sensitive material), such as polyvinylidene fluoride (PVDF), where a bending mode output of the piezoelectric film may be many times more than that of a compression mode. PMUT may offer advantages for sensor arrays such as increased bandwidth, flexible geometries, reduced voltage requirements, and multiple resonant frequencies. PMUT sensors may operate in a broadband mode and may be used for imaging arrays.

A CMUT of the device 110 may be a transducer that is based on the movement of a pressure diaphragm that is one electrode of a capacitor. A CMUT may be constructed on a semiconductor (e.g., silicon) using micromachining techniques, or may be constructed using various ceramic materials. The CMUT may include a cavity formed in a substrate and a thin layer or membrane (e.g., metallized layer) suspended over the cavity that may serve as a measurement diaphragm. In some cases, the cavity may be filled with a dielectric oil or spacer to increase capacitance of the CMUT. The metallized layer may act as a top electrode of the capacitor and the substrate may act as a bottom electrode of the capacitor. If the CMUT is configured as a transmitter, an AC voltage may be applied across the electrodes and the membrane may vibrate to produce ultrasonic waves. If the CMUT is configured as a receiver, ultrasonic waves applied to the membrane of the CMUT may generate an alternating voltage signal as the capacitance of the CMUT varies due to vibrations in the top electrode. CMUT sensors may be constructed as 2D arrays of transducers, where large numbers of CMUT elements may be included in a transducer array, providing larger bandwidth (e.g., compared to other transducer technologies). CMUT arrays may achieve a high frequency operation due to their smaller dimensions, where the frequency of operation may depend on a cell size (e.g., cavity size) and a stiffness of the top electrode membrane. Like PMUT sensors, CMUT sensors may operate in a broadband mode and may be used for imaging arrays.

The ultrasonic receiver or sensor array of the device 110 (e.g., PMUT or CMUT array) may include one or more electrodes that may each be associated (e.g., connected to) a transceiver circuit (e.g. a transmit circuit and a receive circuit), and each electrode in the receiver array may perform aspects of biometric sensing and imaging (e.g., to sense and image a fingerprint). In some examples, the sensor of the device 110 may be attached to or mounted on a frame of the device 110 near or under a cover surface of the device's 110 display (e.g., an organic light emitting diode (OLED) display, plastic OLED (pOLED) display, etc.). Further, the device 110 may include electrical connections associated with the sensor.

For example, the device 110 may include an array of pixel circuits disposed on a substrate (e.g., which may be referred to as a backplane). In some examples, each pixel circuit may include one or more thin-film transistor components, electrical interconnect traces and, in some examples, one or more additional circuit components such as diodes, capacitors, and the like. Each pixel circuit may include a pixel input electrode (e.g., that electrically couples the piezoelectric or capacitive layer to the pixel circuit). A layer of piezo-sensitive material or capacitive material may provide for a thin layer, between the common electrode and the sensor array, with desirable material properties to isolate each pixel from neighboring pixels and enable effective ultrasonic signal sensing.

An ultrasonic signal (e.g., ultrasonic waves) may be generated within a finger of the user 140 (e.g., using a photoacoustic excitation process), such that a generated signal may be measured by the sensor of the device 110. For example, a biological tissue (e.g., finger, eye, etc.) may be biometrically sensed and imaged using an electromagnetic (e.g., photoacoustic) excitation process that generates ultrasonic waves. A radiation component of the device 110 may generate one or more pulses of electromagnetic waves (e.g., light waves, radio waves, infrared waves, ultraviolet waves, etc.), which may encounter the biological tissue and enter the biological tissue. The photons of the electromagnetic waves may excite the biological tissue and generate ultrasonic waves. The ultrasonic waves may propagate within the biological tissue and may be sensed by an ultrasonic sensor (e.g., an ultrasonic receiver array of the device 110). The ultrasonic waves may be converted to pixel image data (e.g., a fingerprint image, retinal scan, etc.) and may be used for biometric authentication.

Some portions of the ultrasonic wave may meet skin that is in contact with the surface (e.g., fingerprint ridges), while other portions of the ultrasonic wave encounter air (e.g., valleys between adjacent ridges of a fingerprint), and may be received with different intensities at the sensor. Each pixel circuit may be configured to convert an electric charge generated in the piezoelectric or capacitive receiver layer (e.g., from the generated ultrasonic signal) proximate to the pixel circuit into an electrical signal. For example, localized charges may be collected by the pixel input electrodes and passed on to the underlying pixel circuits. The charges may then be amplified by the pixel circuits and provided to the control electronics, which processes the output signals.

Ultrasonic signals associated with the fingerprint of the user 140 may thus be processed by the device 110 and converted to a digital value representing the signal strength of the received signal. When multiple ultrasonic signals are collected over a distributed area, the digital values of such signals may be used to produce a graphical representation of the signal strength over the distributed area (e.g., by converting the signals to pixels). For example, the device 110 may convert the digital values to an image (e.g., pixels forming an image), thereby producing an image of the finger of the user 140. In some examples, the device 110 may further compare the produced image to a stored image (e.g. stored in database 130) for authentication decisions.

For example, each pixel of a pixel array may be associated with a region (e.g., local region) of the piezo-sensitive or capacitive layer, and may include or be associated with a peak detection diode and a readout transistor (e.g., these components may be formed on or in the backplane to form the pixel circuit). The region of piezoelectric or capacitive sensor material of each pixel may transduce received ultrasonic energy into electrical charges. The peak detection diode may register the maximum amount of charge detected by the region of piezoelectric or capacitive sensor material. Each row of the pixel array may then be scanned (e.g., through a row select mechanism, a gate driver, or a shift register) and the readout transistor for each column may be triggered to allow the magnitude of the peak charge for each pixel to be read by additional circuitry (e.g., a multiplexer, an analog to digital converter, etc.). The pixel circuit may include one or more thin-film transistors to allow gating, addressing, and resetting of the pixel. Each pixel circuit may provide information about a small portion of the finger detected by the sensor of the device 110. In some examples, the detection area of the sensor of the device 110 may be selected. For example, the detection area may range from about 5 mm×5 mm for a single finger to about 3 inches×3 inches for four fingers. Smaller and larger areas, including square, rectangular and non-rectangular geometries, may be used as appropriate for biometric sensing and imaging.

The server 125 may be a computing system or an application that may be an intermediary node in the system 100 between the device 110 or the database 130. The server 125 may include any combination of a data server, a cloud server, a server associated with an authentication service provider, proxy server, mail server, web server, application server (e.g., authentication application server), database server, communications server, home server, mobile server, or any combination thereof. The server 125 may also transmit to the device 110 a variety of authentication information, such as biometric information, configuration information, control instructions, and other information, instructions, or commands relevant to performing a biometric sensing operation (e.g., to sense and image a fingerprint of the user 140).

The database 130 may store data that may include biometric information for an authentication environment, or commands relevant to reducing background signals for the device 110 when performing a biometric sensing operation (e.g., to sense and image a fingerprint of the user 140). The device 110 may retrieve the stored data from the database via the network 120 using communication links 135. In some examples, the database 130 may be a relational database (e.g., a relational database management system (RDBMS) or a Structured Query Language (SQL) database), a non-relational database, a network database, an object-oriented database, among others that stores the variety of biometric information, such as instructions or commands relevant to sensing biometric information.

The network 120 that may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using 3G, 4G, LTE, or NR systems (e.g., 5G for example), etc. Network 120 may include the Internet.

The base station 105 may wirelessly communicate with the device 110 via one or more base station antennas. Base station 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The device 110 described herein may be able to communicate with various types of base stations and network equipment including macro eNBs, small cell eNBs, gNBs, relay base stations, and the like.

The communication links 135 shown in the system 100 may include uplink transmissions from the device 110 to the base station 105, or the server 125, and/or downlink transmissions, from the base station 105 or the server 125 to the device 110. The downlink transmissions may also be called forward link transmissions while the uplink transmissions may also be called reverse link transmissions. The communication links 135 may transmit bidirectional communications and/or unidirectional communications. The communication links 135 may include one or more connections, including but not limited to, 345 MHz, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to system 100.

Figure 2:
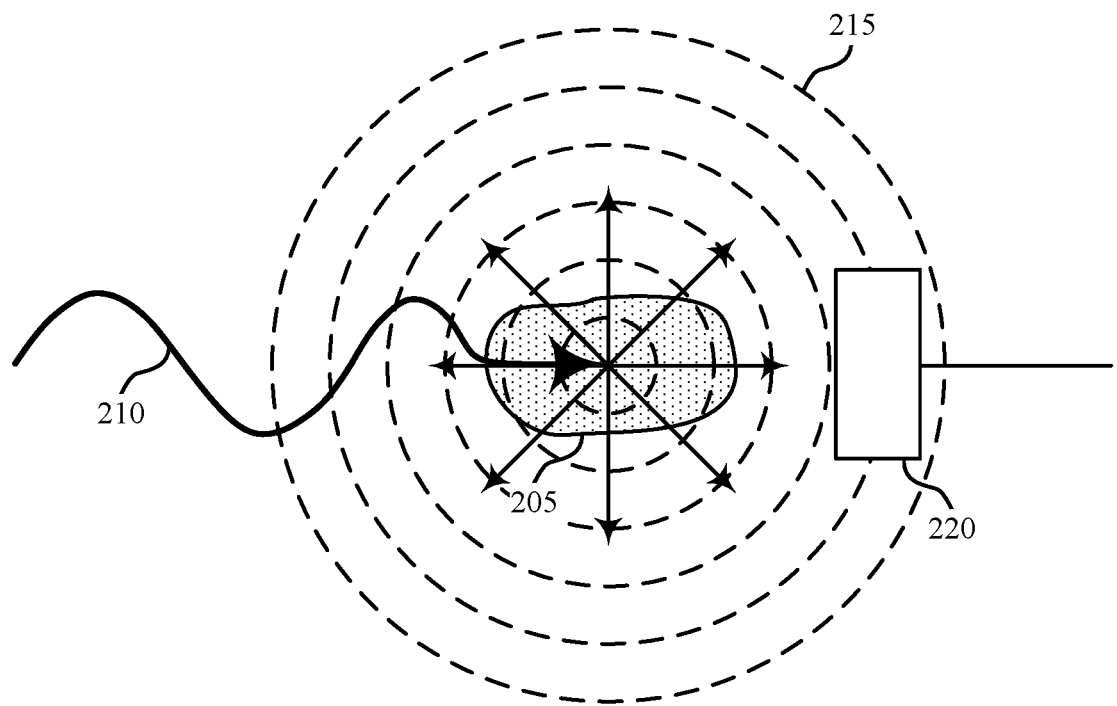
FIG. 2 illustrates an example of a sensing scheme that supports ultrasonic fingerprint scanning by means of photoacoustic excitation in accordance with aspects of the present disclosure.

FIG. 2 illustrates an example of an excitation scheme 200 that supports ultrasonic fingerprint scanning by means of photoacoustic excitation in accordance with aspects of the present disclosure. In some examples, excitation scheme 200 may implement aspects of system 100 and may be implemented by a device 110 (e.g., among other devices) described with reference to FIG. 1. A sensor on a device 110, such as an ultrasonic imaging sensor having one or more transducer components (e.g., PMUTs, CMUTs, etc.), may determine ridges and valleys of a fingerprint for biometric sensing purposes. In some examples, the sensor configurable (or configured) with one or more electromagnetic radiation components (e.g., light emitting diodes (LEDs), radio wave antennas, etc.) may excite a biological tissue with electromagnetic waves to generate one or more ultrasonic waves that may be sensed at the sensor (e.g., which may include a pixel array).

For example, a biological tissue 205 (e.g., finger, eye, etc.) may be sensed and imaged using a photoacoustic excitation process. One or more electromagnetic radiation components of a sensing device (e.g., device 110) may generate one or more time-varying (e.g., pulsed) electromagnetic waves 210 (e.g., light waves, radio waves, infrared waves, ultraviolet waves, etc.). Electromagnetic waves 210 may encounter biological tissue 205 and may (e.g., partially) enter biological tissue 205 and excite biological tissue 205. For example, one or more photons of electromagnetic waves 210 may interact with biological tissue 205 to generate ultrasonic waves 215 (e.g., generate acoustic energy). In some examples, a region of biological tissue 205 may absorb one or more photons at different times, and the one or more photons may be converted into heat energy within the region of biological tissue 205. The region may change (e.g., expand and contract) due to temperature change from the heat energy when absorbing photons or from the lack of heat energy when not absorbing photons. The change may result in pressure changes that may be transmitted as ultrasonic waves 215.

In some cases, the pressure changes may propagate within biological tissue 205 and resulting ultrasonic waves may be sensed by an ultrasonic sensor 220 (e.g., ultrasonic receiver array such as a PMUT array, CMUT array, etc.) coupled to biological tissue 205, and the ultrasonic waves 215 may be converted to pixel image data. In some cases, ultrasonic sensor 220 may image a number of plane slices through biological tissue 205 to generate a tomographic representation (e.g., image) of a fingerprint. For example, the device may be configured to generate (e.g., using targeted electromagnetic waves 210) and sense (e.g., via ultrasonic sensor 220) ultrasonic waves 215 generated across one or more of an axial plane, a coronal plane, or a sagittal plane associated with biological tissue 205. The sensed ultrasonic waves 215 may be combined over different planes (e.g., in the same or different directions) to generate a tomographic image.

In some cases, electromagnetic waves 210 may include radio frequency energy, green light, visible light, microwaves, near-infrared waves, infrared waves, and/or ultraviolet waves created by the one or more electromagnetic radiation components (e.g., a source). In some cases, the source of electromagnetic waves 210 may be a display, such as an OLED display (e.g., on a device 110) or another type of display. Additionally or alternatively, the source of electromagnetic waves 210 may be separate from a display of a device 110. For example, the source of electromagnetic waves 210 may be separate from the display, such as outside of the display or outside of a footprint of the display within the device 110, and in some cases, the source may be outside of a footprint of the device 110 (e.g., while being coupled to the device 110). In some cases, the source of electromagnetic waves 210 may be a radio wave antenna. In some examples, the wavelength of electromagnetic waves 210 may determine a depth of penetration into biological tissue 205 (e.g., because of tradeoffs between an extinction or absorption coefficient and the depth of penetration). For example, a green light wave may cause higher levels of excitation in biological tissue 205 and may have a shorter penetration depth, while an infrared wave may cause lower excitation levels and may have a larger penetration depth. Accordingly, the wavelength of electromagnetic waves 210 may be selected based on a target depth of penetration into biological tissue 205 (e.g., based on the portions of biological tissue 205 that are being imaged).

In some examples, a display (e.g., OLED smartphone display) may be used as the source for electromagnetic waves 210, where the display may excite biological tissue 205 with both red wavelengths (e.g., to excite deeper features of biological tissue 205) and blue or green wavelengths (e.g., to excite near-surface features of biological tissue 205). In some cases, the device 110 may strobe rows or columns (e.g., one, two, three, etc. at a time) of electromagnetic waves 210 onto biological tissue 205 to avoid congestion at sensor 220. For example, sensor 220 may be congested if a sufficient number of elements in sensor 220 are active, which may cause signal degradation to occur due to receiver saturation.

In one example, excitation scheme 200 may be used to generate a biometric image of a finger (e.g., a finger may represent biological tissue 205). Accordingly, one or more electromagnetic waves 210 may be generated by a sensing device (e.g., device 110) and may interact with the finger. As discussed above, electromagnetic waves 210 may generate one or more ultrasonic waves 215 within the finger that may propagate through the finger. Ultrasonic waves 215 may excite hemoglobin in capillaries and blood vessels in the finger and may produce a fingerprint image at a sensor 220, as discussed with reference to FIG. 1. For example, ridges of a fingerprint may pass (e.g., reflect) ultrasonic waves 215 and valleys of the fingerprint may not pass ultrasonic waves 215 (e.g., or may pass ultrasonic waves with a lower power), resulting in a fingerprint image that may be sensed at sensor 220. The sensing process may be carried out without requiring an acoustic ensonification process because the ultrasonic pulse may be generated within the finger.

Figure 3A:
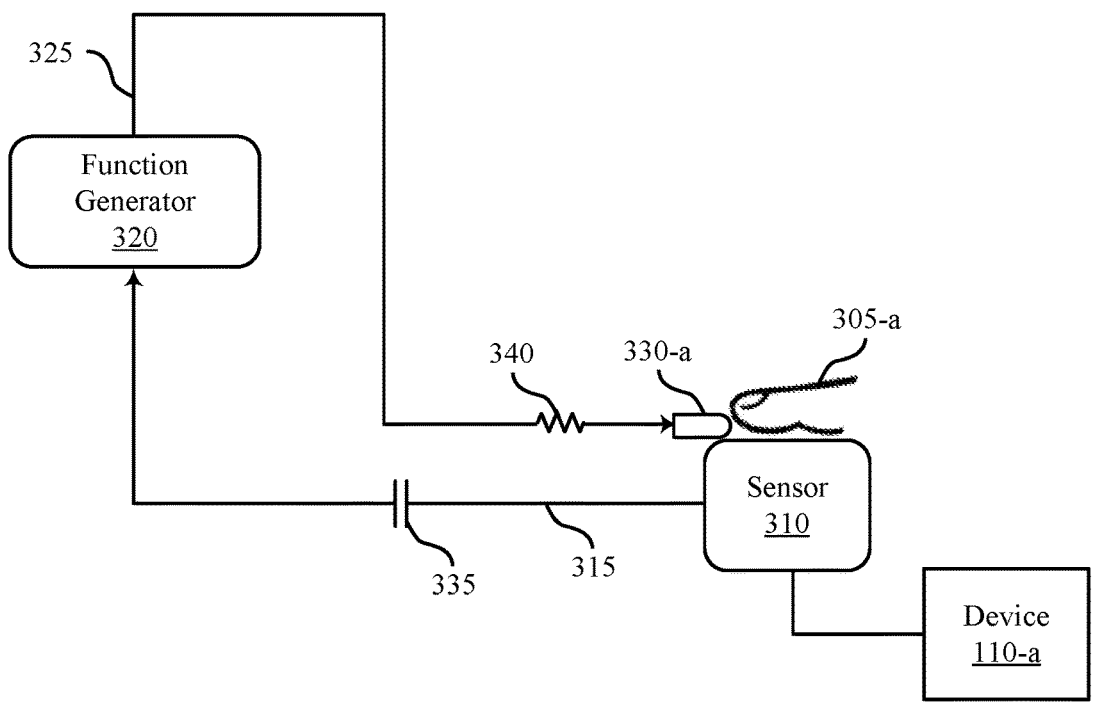
FIGS. 3A and 3B illustrate examples of sensing modes that support ultrasonic fingerprint scanning by means of photoacoustic excitation in accordance with aspects of the present disclosure.
Figure 3B:
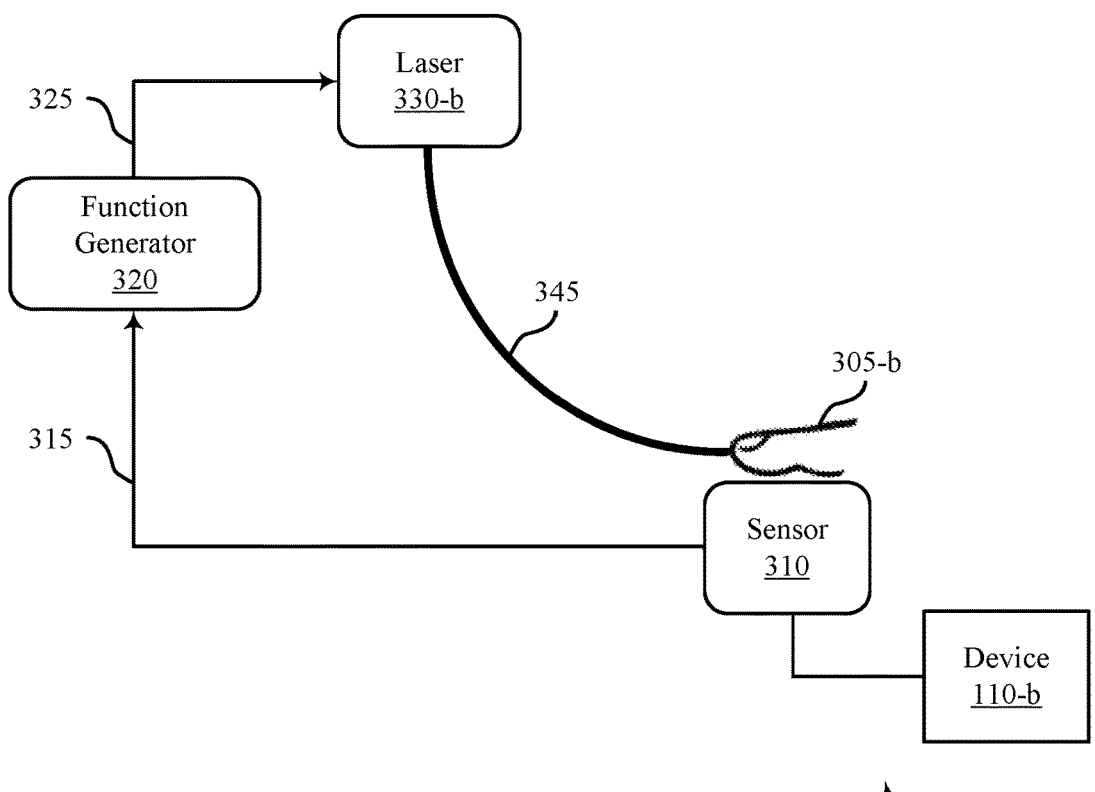

FIGS. 3A and 3B illustrate examples of sensing modes 301 and 302 that support ultrasonic fingerprint scanning by means of photoacoustic excitation in accordance with aspects of the present disclosure. In some examples, sensing modes 301 and 302 may implement aspects of system 100 or excitation scheme 200. In some cases, aspects of sensing modes 301 and 302 may be implemented by a device 110-*a* or 110-*b*, which may an example of a device 110 described with reference to FIGS. 1 and 2. Device 110-*a* or 110-*b* may interact with a biological tissue, such as a finger 305-*a* or 305-*b*, to perform photoacoustic excitation of the biological tissue and produce a biometric image (e.g., a fingerprint).

In some examples, device 110-*a* or 110-*b* may represent a personal electronic device or may form part of a personal device, such as a smartphone. Additionally or alternatively, device 110-*a* or 110-*b* may represent part of a security device, a medical imaging device, or the like. In one example, device 110-*a* or 110-*b* may be coupled with a sensor 310 (e.g., ultrasonic receiver array) and may generate a synchronization signal 315 to produce time-varying electromagnetic waves (e.g., electromagnetic wave pulses) to interact with finger 305-*a*.

In a first example illustrated in FIG. 3A, synchronization signal 315 may be generated by device 110-*a* or sensor 310 and may pass (e.g., through a capacitor 335 and) into a function generator 320. Function generator 320 may receive synchronization signal 315 as an external trigger and may produce a pulse signal 325 based on synchronization signal 315. In some cases, pulse signal 325 may pass through a resistor 340 and into an electromagnetic wave source 330-*a* to generate pulses of electromagnetic waves to biometrically image finger 305-*a*. In some cases, electromagnetic wave source 330-*a* may be an example of one or more LEDs or other light sources. Additionally or alternatively, electromagnetic wave source 330-*a* may emit infrared waves, radio waves, or the like. Electromagnetic wave source 330-*a*, sensor 310, and other components used in sensing mode 301 may be internal or external to device 110-*a* (e.g., internal or external to a footprint of device 110-*a*).

In a second example illustrated in FIG. 3B, synchronization signal 315 may be generated by device 110-*b* or sensor 310 and may pass into a function generator 320. Function generator 320 may receive synchronization signal 315 as an external trigger and may produce a pulse signal 325 based on synchronization signal 315. In some cases, pulse signal 325 may pass into an electromagnetic wave source (e.g., a laser 330-*b*) as an external trigger to generate pulses of electromagnetic waves to biometrically image finger 305-*b*. In some cases, laser 330-*b* may emit visible light, infrared waves, radio waves, or the like. In some examples, laser 330-*b* may be coupled with and interact with finger 305-*b* via a light pipe 345. Laser 330-*b*, sensor 310, and other components used in sensing mode 302 may be internal or external to device 110-*b* (e.g., internal or external to a footprint of device 110-*b*).

As described with reference to FIGS. 2, 3A and 3B, pulses of electromagnetic waves may enter finger 305-*a* or 305-*b* (e.g., penetrate finger 305-*a* or 305-*b* to a certain depth) and may interact with finger tissue to propagate ultrasonic waves from the finger tissue and into sensor 310. In one example, electromagnetic wave source 330 may be positioned in a reflected illumination mode, such that electromagnetic waves may enter finger 305-*a* from a same side on which sensor 310 is positioned. In a separate example, electromagnetic wave source 330 may be positioned in a direct illumination mode, such that electromagnetic waves may enter finger 305-*a* from a different side (e.g., opposite side) from which sensor 310 is positioned. Sensor 310 (e.g., a PMUT array, a CMUT array, etc.) may be configured to measure ultrasonic waves and generate an image from the measured ultrasonic waves.

As discussed above, electromagnetic waves may generate one or more ultrasonic waves within finger 305-*a* that may propagate through finger 305-*a*. In some cases, ultrasonic waves may excite hemoglobin in capillaries and blood vessels in the finger and may produce a fingerprint image at sensor 310, as discussed with reference to FIG. 2. For example, ridges of a fingerprint may pass (e.g., reflect) ultrasonic waves and valleys of the fingerprint may not pass ultrasonic waves (e.g., or may pass ultrasonic waves with a lower power), resulting in a fingerprint image that may be sensed at sensor 310.

In some cases, electromagnetic wave source 330 may be configured (e.g., by device 110-*a* or 110-*b*, by a processor, using a physical component, etc.) to illuminate finger 305-*a* with different wavelengths of electromagnetic waves (e.g., different colors of visible light), where each wavelength may excite different internal biological objects within finger 305-a (e.g., blood vessels, finger tissue, etc.). In some cases, electromagnetic wave source 330 may produce one or more wavelengths of electromagnetic waves based on a target depth of penetration into finger 305-a or 305-b. In one example, electromagnetic wave source 330 may produce electromagnetic waves with a wavelength of green light (e.g., 532 nanometers (nm)), which may penetrate a shorter distance into finger 305-a and may produce higher ultrasonic excitation. In another example, electromagnetic wave source 330 may produce electromagnetic waves with a wavelength of near infrared illumination to produce ultrasound waves at deeper finger tissue. In another example, electromagnetic wave source 330 may produce electromagnetic waves with red wavelengths, blue wavelengths, green wavelengths, or a combination thereof to produce ultrasound waves and a resultant biometric image.

In some cases, a user or device 110-a or 110-b may control one or more parameters to adjust characteristics of ultrasonic waves received at device 110-a or 110-b. For example, the one or more parameters may be controlled to adjust characteristics such as a received signal strength, an image focal point, an image contrast, an image resolution, etc. Some examples of the one or more controlled parameters may include electromagnetic wave intensity (e.g., light brightness), distance from finger 305-a or 305-b to the sensor 310, distance from finger 305-a or 305-b to electromagnetic wave source 330, timing of the electromagnetic pulses, a timing associated with the sensor 310, etc.

Figure 4:
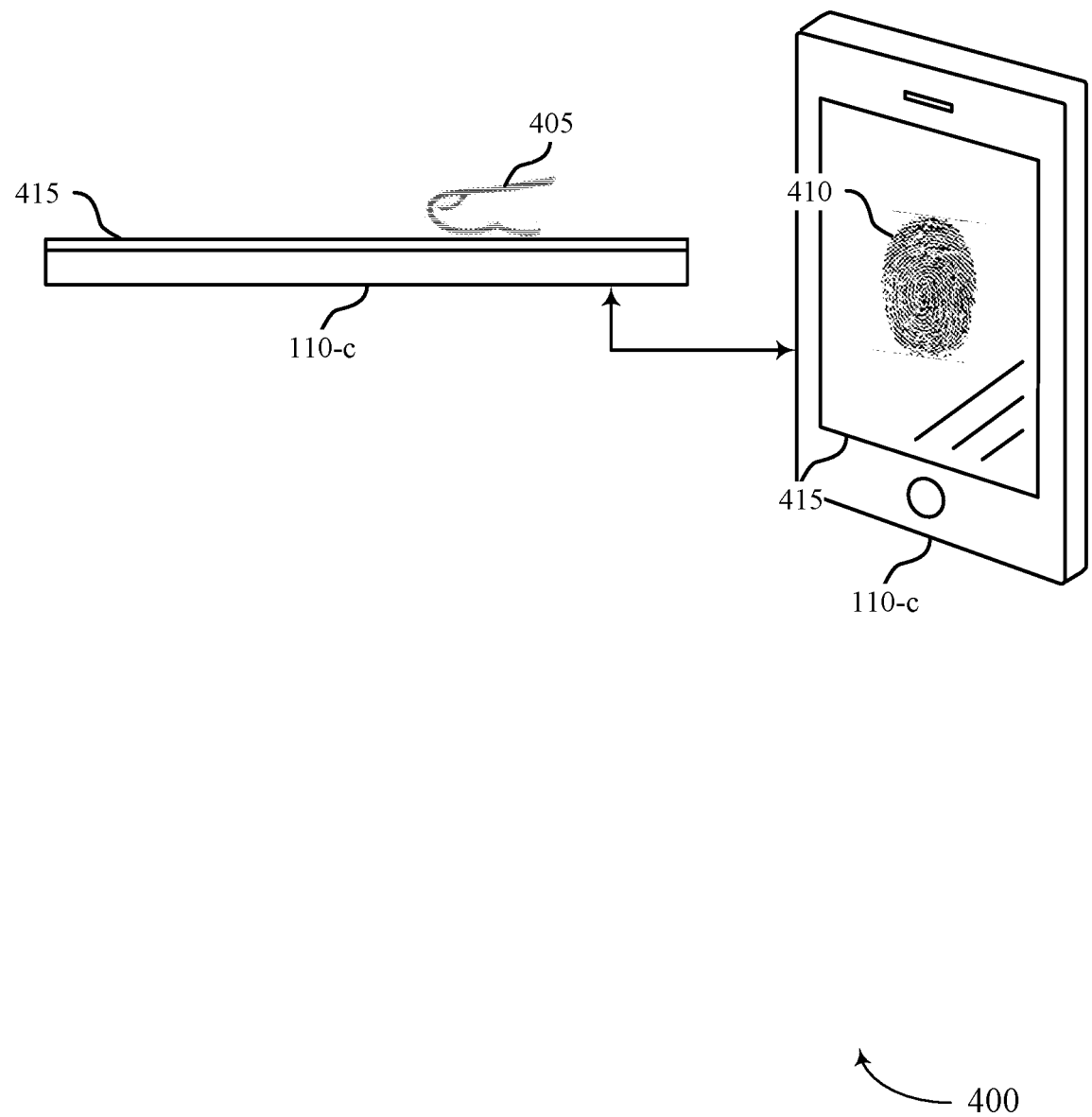
FIG. 4 illustrates an example of a sensing mode that supports ultrasonic fingerprint scanning by means of photoacoustic excitation in accordance with aspects of the present disclosure.

FIG. 4 illustrates an example of a sensing mode 400 that supports ultrasonic fingerprint scanning by means of photoacoustic excitation in accordance with aspects of the present disclosure. In some examples, sensing mode 400 may implement aspects of system 100 or excitation scheme 200 and may be implemented by a device 110-c, which may be an example of a device 110 described with reference to FIGS. 1-3. Device 110-c may interact with a biological tissue, such as a finger 405, to perform photoacoustic excitation of the biological tissue and produce a biometric image (e.g., from resulting ultrasonic waves).

In some examples, device 110-c may be a personal electronic device, such as a smartphone, and may include a display 415 (e.g., an LED or OLED display). Display 415 may be configured to produce pulses of one or more electromagnetic waves, which may interact with finger 405. As described with reference to FIG. 2, electromagnetic waves may enter finger 405 (e.g., penetrate finger 405 to a certain depth) and interact with finger tissue, causing ultrasonic waves to propagate in response (e.g., from the finger tissue). In some cases, device 110-c may be configured with an ultrasonic receiver or sensor (e.g., a PMUT array, a CMUT array, etc.) to measure ultrasonic waves. Device 110-c may measure ultrasonic waves and may use the measurement to generate a biometric image 410, such as fingerprint image. For example, measurements of ultrasonic waves may be used an ensonification source for fingerprint imaging (e.g., may produce a flat image). In some cases, imaging a fingerprint in this manner may capture a fingerprint image that is not affected by worn fingerprint ridges and/or skin damage.

In some cases, display 415 may be configured to illuminate finger 405 with different wavelengths of electromagnetic waves (e.g., different colors of visible light), where each wavelength may excite different internal biological objects within finger 405 (e.g., blood vessels, finger tissue, etc.). In some cases, display 415 may produce one or more wavelengths of electromagnetic waves based on a target depth of penetration into finger 305-c. In one example, display 415 may produce electromagnetic waves with a wavelength of green light, which may penetrate a shorter distance into finger 405 and may produce higher ultrasonic excitation to capture and generate biometric image 410. In another example, display 415 may produce electromagnetic waves with a wavelength of near infrared illumination to produce ultrasound waves at deeper finger tissue and generate a biometric image 410. In another example, display 415 may produce electromagnetic waves with red wavelengths, blue wavelengths, green wavelengths, or a combination thereof to produce ultrasound waves and a resulting tomographic biometric image.

In some cases, a user or device 110-c may control one or more parameters to adjust characteristics of ultrasonic waves received at device 110-c. For example, the one or more parameters may be controlled to adjust characteristics such as a received signal strength, an image focal point, an image contrast, an image resolution, etc. Some examples of the one or more controlled parameters may include electromagnetic wave intensity (e.g., light brightness), distance from finger 405 to the ultrasonic sensor, distance from finger 405 to an electromagnetic wave source, timing of the electromagnetic pulses, a timing associated with the ultrasonic sensor, etc.

Figure 5:
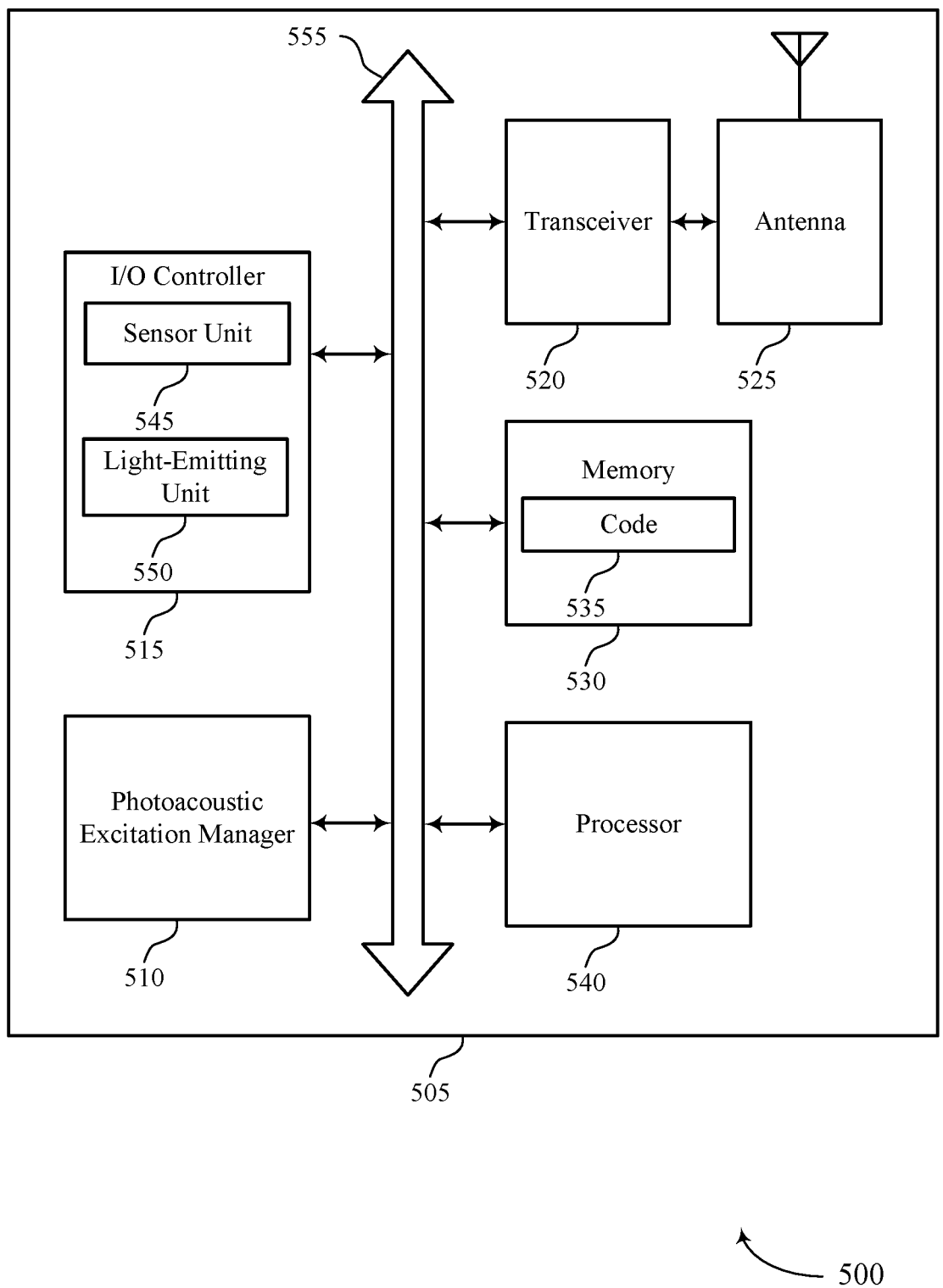
FIG. 5 shows a block diagram of a device that supports ultrasonic fingerprint scanning by means of photoacoustic excitation in accordance with aspects of the present disclosure.

FIG. 5 shows a diagram of a system 500 including a device 505 that supports ultrasonic fingerprint scanning by means of photoacoustic excitation in accordance with aspects of the present disclosure. The device 505 may be an example of or include the components of device 110 as described herein. The device 505 may include an ultrasonic imaging sensor configured to determine ridges and valleys of a fingerprint. The ultrasonic imaging sensor may include a pixel array which may include a multiple PMUTs or CMUTs. The device 505 may include components for bi-directional data communications including components for transmitting and receiving communications, including a photoacoustic excitation manager 510, an I/O controller 515, memory 530, and a processor 540. These components may be in electronic communication via one or more buses (e.g., bus 555).

The photoacoustic excitation manager 510 may perform a sensing scheme that performs photoacoustic excitation to generate and sense ultrasonic waves (e.g., via imaging sensors configured with PMUTs or CMUTs). The sensing scheme may include the photoacoustic excitation manager 510 generating, via a light emitting source of the device, one or more pulses of electromagnetic radiation waves, where the light emitting source is separate from a display interface of the device, emitting, via the light emitting source, the one or more pulses of electromagnetic radiation waves to generate one or more ultrasonic signals associated with one or more biological tissues of a finger, sensing, via an ultrasonic receiver array of the device, the one or more generated ultrasonic signals based on emitting the one or more pulses of electromagnetic radiation waves, generating a fingerprint image including at least one of ridges or valleys associated with the finger based on the sensing, and outputting a representation of the fingerprint image.

In some examples, the photoacoustic excitation manager 510 may emit the one or more pulses of electromagnetic radiation waves from the light emitting source of the device that is external to a footprint of the display interface. In some examples, the photoacoustic excitation manager 510 may emit the one or more pulses of electromagnetic radiation waves from the light emitting source that is external to a footprint of the device. In some examples, the photoacoustic excitation manager 510 may sense, via the ultrasonic receiver array of the device, the one or more generated ultrasonic signals across one or more of an axial plane, a coronal plane, or a sagittal plane associated with the finger, where the fingerprint image includes a tomographic fingerprint image based on sensing the one or more generated ultrasonic signals across one or more of the axial plane, the coronal plane, or the sagittal plane associated with the finger.

In some examples, the photoacoustic excitation manager 510 may sense, via a PMUT of the device, the one or more generated ultrasonic signals. In some examples, the photoacoustic excitation manager 510 may sense, via a CMUT of the device, the one or more generated ultrasonic signals. In some examples, the photoacoustic excitation manager 510 may convert the one or more generated ultrasonic signals to one or more pixels based on one or more pixel elements of the array of pixels elements, where generating the fingerprint image is further based on the converting. In some examples, the photoacoustic excitation manager 510 may select one or more wavelengths of the one or more pulses of electromagnetic radiation waves based on a target depth level associated with the one or more biological tissues of the finger to stimulate the one or more biological tissues of the finger to generate the one or more ultrasonic signals, where emitting, via the light emitting source of the device, the one or more pulses of electromagnetic radiation waves is further based on the one or more wavelengths.

In some examples, outputting, via the display interface of the device, the representation of the fingerprint image, where the display interface includes an OLED display interface. In some cases, the one or more wavelengths are within one or more of a radio spectrum of an electromagnetic spectrum, a microwave spectrum of the electromagnetic spectrum, a near-infrared spectrum of the electromagnetic spectrum, an infrared spectrum of the electromagnetic spectrum, a visible spectrum of the electromagnetic spectrum, or an ultraviolet spectrum of the electromagnetic spectrum. In some cases, the ridges associated with the finger reflect the one or more generated ultrasonic signals. In some cases, the valleys associated with the finger absorb or alter the one or more generated ultrasonic signals. In some cases, the light emitting source includes one or more of a LED, a laser, or an OLED display interface. In some cases, the one or more ultrasonic signals are generated by the one or more biological tissues within the finger based on the one or more pulses of electromagnetic radiation waves.

The photoacoustic excitation manager 510, or its sub-components, may be implemented in hardware, code (e.g., software or firmware) executed by a processor, or any combination thereof. If implemented in code executed by a processor, the functions of the photoacoustic excitation manager 510, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The photoacoustic excitation manager 510, or its sub-components, may be physically located at various positions, including being distributed such that portions of functions are implemented at different physical locations by one or more physical components. In some examples, the photoacoustic excitation manager 510, or its sub-components, may be a separate and distinct component in accordance with various aspects of the present disclosure. In some examples, the photoacoustic excitation manager 510, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The I/O controller 515 may manage input and output signals for the device 505. The I/O controller 515 may also manage peripherals not integrated into the device 505. In some cases, the I/O controller 515 may represent a physical connection or port to an external peripheral. In some cases, the I/O controller 515 may utilize an operating system such as iOS, ANDROID, MS-DOS, MS-WINDOWS, OS/2, UNIX, LINUX, or another known operating system. In other cases, the I/O controller 515 may represent or interact with a modem, a keyboard, a mouse, a touchscreen, or a similar device. In some cases, the I/O controller 515 may be implemented as part of a processor. In some cases, a user may interact with the device 505 via the I/O controller 515 or via hardware components controlled by the I/O controller 515.

In some examples, the I/O controller 515 may include a sensor unit 545 and a light-emitting unit 550. The sensor unit 545 may include one or more sensors (e.g., which may be referred to as an ultrasonic sensor, and electrode array, a scanner, etc.) to sense biometric information (e.g., to determine valley and ridges of a fingerprint). The sensor unit 545 may include a pixel array including one or more PMUTs or CMUTs and may be coordinated with the light-emitting unit 550. For example, the sensor unit 545 may receive one or more signals (e.g., signals generated using photoacoustic excitation) or imaging information indicative of traits (e.g., biometric traits) associated with a fingerprint (or other object). In response to the one or more signals, the processor 540 may image the fingerprint, perform an authentication analysis, etc. In some cases, the sensor unit 545 may be attached to or mounted on a frame of the device 505 near or under a cover surface of the device's display (e.g., an OLED display, a pOLED display, etc.).

The device 505 may also include electrical connections associated with the sensor unit 545 and the processor 540. In some examples, the photoacoustic excitation manager 510 may control various aspects of the sensor unit 545 (e.g., ultrasonic transmitter timing and coordination with excitation waveforms, bias voltages for the ultrasonic receiver and pixel circuitry, pixel addressing, signal filtering and conversion, readout frame rates, and so forth). The processor 540 may send level select input signals through another bias driver to bias one or more electrodes and allow gating of acoustic signal detection by the sensor unit 545 (e.g., pixel circuitry). A demultiplexer may be used to turn on and off gate drivers that cause a particular row or column of the sensor unit 545 (e.g., sensor pixel circuits) to provide sensor output signals. Output signals from the pixels may be sent through a charge amplifier, a filter (e.g., an anti-aliasing filter), and a digitizer to the processor 540.

The light-emitting unit 550 may include one or more sources for producing electromagnetic wave pulses (e.g., which may be referred to as an electromagnetic wave source) to perform photoacoustic excitation and generate ultrasonic waves to determine valley and ridges of a fingerprint). The light-emitting unit 550 may be coordinated with the sensor unit 545 to detect ultrasonic waves and generate a fingerprint image. For example, the light-emitting unit 550 may produce one or more electromagnetic waves that may excite tissue within a finger and generate one or more ultrasonic waves or signals. In response to the one or more signals, the processor 540 may image the fingerprint, perform an authentication analysis, etc. In some cases, the light-emitting unit 550 may be attached to or mounted on a frame of the device 505 near or under a cover surface of the device's display (e.g., an OLED display, a pOLED display, etc.), within the device's display, or outside of the device.

The device 505 may also include electrical connections associated with the light-emitting unit 550 and the processor 540. In some examples, the photoacoustic excitation manager 510 may control various aspects of the light-emitting unit 550 (e.g., electromagnetic wave timing and wavelength, and so forth). For example, the processor 540 may send an excitation signal to a driver of the light-emitting unit 550 to cause the driver to produce electromagnetic waves or signals.

The memory 530 may include RAM and ROM. The memory 530 may store computer-readable, computer-executable code or software 535 including instructions that, when executed, cause the processor to perform various functions described herein. In some cases, the memory 530 may contain, among other things, a BIOS which may control basic hardware or software operation such as the interaction with peripheral components or devices.

The software 535 may include instructions to implement aspects of the present disclosure, including instructions to support biometric scanning. The software 535 may be stored in a non-transitory computer-readable medium such as system memory or other type of memory. In some cases, the software 535 may not be directly executable by the processor 540 but may cause a computer (e.g., when compiled and executed) to perform functions described herein.

The processor 540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 540 may be configured to operate a memory array using a memory controller. In other cases, a memory controller may be integrated into the processor 540. The processor 540 may be configured to execute computer-readable instructions stored in a memory (e.g., the memory 530) to cause the device 505 to perform various functions (e.g., functions or tasks reducing background signals in imaging sensors, supporting ultrasonic biometric sensing).

The processor 540 may receive the one or more signals representative of a fingerprint, and may process such information as discussed herein (e.g., the processor 540 may image a fingerprint, perform authentication procedures, etc.). In some cases, the processor 540 and/or light-emitting unit 550 may introduce an applied voltage that may drive one or more electromagnetic wave sources of the light-emitting unit 550 to transmit one or more electromagnetic waves. The processor 540 may receive data from the sensor unit 545 that may include translating digitized data into image data of the fingerprint or format the data for further processing (e.g., such as for authentication procedures). In some other cases, the processor 540 and/or sensor unit 545 may apply bias voltages to one or more electrodes of the sensor unit 545 to receive a generated ultrasonic signal, such that the processor may output a representation of the fingerprint using an image processing technique.

As detailed above, the photoacoustic excitation manager 510 and/or one or more components of the photoacoustic excitation manager 510 may perform and/or be a means for performing, either alone or in combination with other components, one or more operations for supporting ultrasonic fingerprint scanning by means of photoacoustic excitation. For example, the photoacoustic excitation manager 510 may perform and/or be a means for generating, via a light emitting source of the device 505, one or more pulses of electromagnetic radiation waves, where the light emitting source is separate from a display interface of the device 505. In some examples, the sensor unit 545 either alone or in combination with the light-emitting unit 550 may perform and/or be means for generating, via a light emitting source of the device 505, one or more pulses of electromagnetic radiation waves, where the light emitting source is separate from a display interface of the device 505.

The photoacoustic excitation manager 510 may perform and/or be a means for emitting, via the light emitting source, the one or more pulses of electromagnetic radiation waves to generate one or more ultrasonic signals associated with one or more biological tissues of a finger. In some examples, the sensor unit 545 either alone or in combination with the light-emitting unit 550 may perform and/or be means for emitting, via the light emitting source, the one or more pulses of electromagnetic radiation waves to generate one or more ultrasonic signals associated with one or more biological tissues of a finger. The photoacoustic excitation manager 510 may perform and/or be a means for sensing, via an ultrasonic receiver array of the device 505, the one or more generated ultrasonic signals based at least in part on emitting the one or more pulses of electromagnetic radiation waves. In some examples, the sensor unit 545 either alone or in combination with the light-emitting unit 550 may perform and/or be means for sensing, via an ultrasonic receiver array of the device 505, the one or more generated ultrasonic signals based at least in part on emitting the one or more pulses of electromagnetic radiation waves. The photoacoustic excitation manager 510 may perform and/or be a means for generating a fingerprint image including at least one of ridges or valleys associated with the finger based at least in part on the sensing. The photoacoustic excitation manager 510 may perform and/or be a means for outputting a representation of the fingerprint image.

Figure 6:
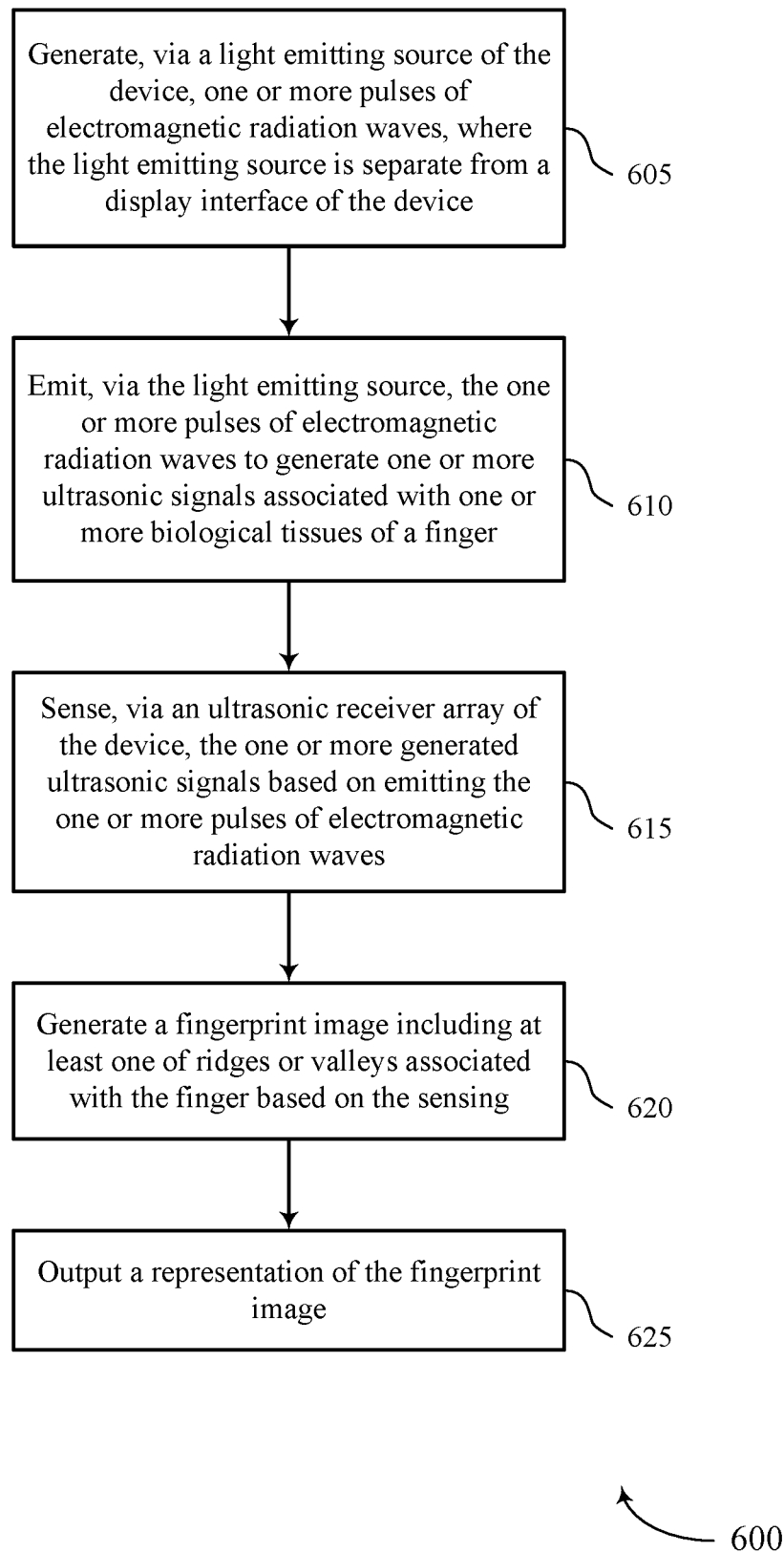
FIGS. 6 and 7 show flowcharts illustrating methods that support ultrasonic fingerprint scanning by means of photoacoustic excitation in accordance with aspects of the present disclosure.

FIG. 6 shows a flowchart illustrating a method 600 that supports ultrasonic fingerprint scanning by means of photoacoustic excitation in accordance with aspects of the present disclosure. The operations of method 600 may be implemented by a device or its components as described herein. For example, the operations of method 600 may be performed by a photoacoustic excitation manager as described with reference to FIG. 5. In some examples, a device may execute a set of instructions to control the functional elements of the device to perform the functions described below. Additionally or alternatively, a device may perform aspects of the functions described below using special-purpose hardware.

At 605, the device may generate, via a light emitting source of the device, one or more pulses of electromagnetic radiation waves, where the light emitting source is separate from a display interface of the device. The operations of 605 may be performed according to the methods described herein. In some examples, aspects of the operations of 605 may be performed by a photoacoustic excitation manager as described with reference to FIG. 5.

At 610, the device may emit, via the light emitting source, the one or more pulses of electromagnetic radiation waves to generate one or more ultrasonic signals associated with one or more biological tissues of a finger. The operations of 610 may be performed according to the methods described herein. In some examples, aspects of the operations of 610 may be performed by a photoacoustic excitation manager as described with reference to FIG. 5.

At 615, the device may sense, via an ultrasonic receiver array of the device, the one or more generated ultrasonic signals based on emitting the one or more pulses of electromagnetic radiation waves. The operations of 615 may be performed according to the methods described herein. In some examples, aspects of the operations of 615 may be performed by a photoacoustic excitation manager as described with reference to FIG. 5.

At 620, the device may generate a fingerprint image including at least one of ridges or valleys associated with the finger based on the sensing. The operations of 620 may be performed according to the methods described herein. In some examples, aspects of the operations of 620 may be performed by a photoacoustic excitation manager as described with reference to FIG. 5.

At 625, the device may output a representation of the fingerprint image. The operations of 625 may be performed according to the methods described herein. In some examples, aspects of the operations of 625 may be performed by a photoacoustic excitation manager as described with reference to FIG. 5.

Figure 7:
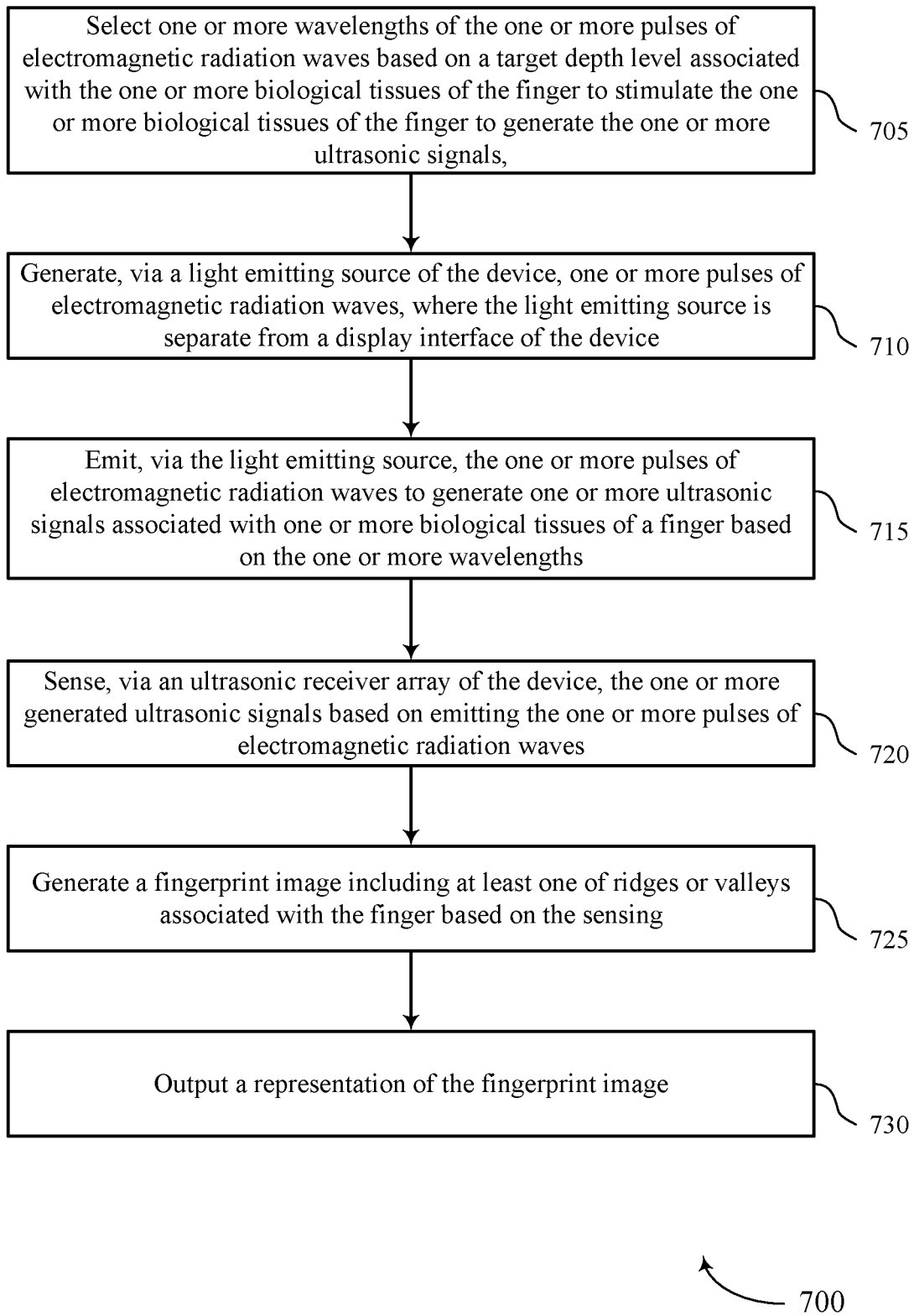

FIG. 7 shows a flowchart illustrating a method 700 that supports ultrasonic fingerprint scanning by means of photoacoustic excitation in accordance with aspects of the present disclosure. The operations of method 700 may be implemented by a device or its components as described herein. For example, the operations of method 700 may be performed by a photoacoustic excitation manager as described with reference to FIG. 5. In some examples, a device may execute a set of instructions to control the functional elements of the device to perform the functions described below. Additionally or alternatively, a device may perform aspects of the functions described below using special-purpose hardware.

At 705, the device may select one or more wavelengths of the one or more pulses of electromagnetic radiation waves based on a target depth level associated with the one or more biological tissues of the finger to stimulate the one or more biological tissues of the finger to generate the one or more ultrasonic signals. The operations of 705 may be performed according to the methods described herein. In some examples, aspects of the operations of 705 may be performed by a photoacoustic excitation manager as described with reference to FIG. 5.

At 710, the device may generate, via a light emitting source of the device, one or more pulses of electromagnetic radiation waves, where the light emitting source is separate from a display interface of the device. The operations of 710 may be performed according to the methods described herein. In some examples, aspects of the operations of 710 may be performed by a photoacoustic excitation manager as described with reference to FIG. 5.

At 715, the device may emit, via the light emitting source, the one or more pulses of electromagnetic radiation waves to generate one or more ultrasonic signals associated with one or more biological tissues of a finger based on the one or more wavelengths. The operations of 715 may be performed according to the methods described herein. In some examples, aspects of the operations of 715 may be performed by a photoacoustic excitation manager as described with reference to FIG. 5.

At 720, the device may sense, via an ultrasonic receiver array of the device, the one or more generated ultrasonic signals based on emitting the one or more pulses of electromagnetic radiation waves. The operations of 720 may be performed according to the methods described herein. In some examples, aspects of the operations of 720 may be performed by a photoacoustic excitation manager as described with reference to FIG. 5.

At 725, the device may generate a fingerprint image including at least one of ridges or valleys associated with the finger based on the sensing. The operations of 725 may be performed according to the methods described herein. In some examples, aspects of the operations of 725 may be performed by a photoacoustic excitation manager as described with reference to FIG. 5.

At 730, the device may output a representation of the fingerprint image. The operations of 730 may be performed according to the methods described herein. In some examples, aspects of the operations of 730 may be performed by a photoacoustic excitation manager as described with reference to FIG. 5.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" will not be construed as a reference to a closed set of conditions. For example, an exemplary step that is described as "based on condition A" may be based on both a condition A and a condition B without departing from the scope of the present disclosure. In other words, as used herein, the phrase "based on" will be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of biometric imaging at a device, comprising:
generating, via a light emitting source of the device, one or more pulses of electromagnetic radiation waves, wherein the light emitting source is separate from a display interface of the device;
selecting a target depth level from a set of target depth levels associated with one or more biological tissues of a finger;
selecting one or more wavelengths of the one or more pulses of electromagnetic radiation waves based at least in part on the selected target depth level associated with the one or more biological tissues of the finger to stimulate the one or more biological tissues of the finger to generate the one or more ultrasonic signals, wherein the selected one or more wavelengths correspond to the selected target depth level;
emitting, via the light emitting source, the one or more pulses of electromagnetic radiation waves, to generate one or more ultrasonic signals associated with one or more biological tissues of the finger, based at least in part on the one or more wavelengths;
sensing, via an ultrasonic receiver array of the device, the one or more generated ultrasonic signals based at least in part on emitting the one or more pulses of electromagnetic radiation waves;
generating a fingerprint image comprising at least one of ridges or valleys associated with the finger based at least in part on the sensing; and
outputting a representation of the fingerprint image.

2. The method of claim 1, wherein emitting, via the light emitting source of the device, the one or more pulses of electromagnetic radiation waves comprises:
emitting the one or more pulses of electromagnetic radiation waves from the light emitting source of the device that is external to a footprint of the display interface.

3. The method of claim 1, wherein emitting, via the light emitting source of the device, the one or more pulses of electromagnetic radiation waves comprises:
emitting the one or more pulses of electromagnetic radiation waves from the light emitting source that is external to a footprint of the device.

4. The method of claim 1, wherein sensing, via the ultrasonic receiver array of the device, the one or more generated ultrasonic signals comprises:
sensing, via the ultrasonic receiver array of the device, the one or more generated ultrasonic signals across one or more of an axial plane, a coronal plane, or a sagittal plane associated with the finger,
wherein the fingerprint image comprises a tomographic fingerprint image based at least in part on sensing the one or more generated ultrasonic signals across one or more of the axial plane, the coronal plane, or the sagittal plane associated with the finger.

5. The method of claim 1, wherein sensing, via the ultrasonic receiver array of the device, the one or more generated ultrasonic signals comprises:
sensing, via a piezoelectric micromachined ultrasonic transducer (PMUT) of the device, the one or more generated ultrasonic signals.

6. The method of claim 1, wherein sensing, via the ultrasonic receiver array of the device, the one or more generated ultrasonic signals comprises:
sensing, via a capacitive micromachined ultrasonic transducer (CMUT) of the device, the one or more generated ultrasonic signals.

7. The method of claim 1, wherein the ultrasonic receiver array of the device comprises an array of pixel elements, and wherein sensing, via the ultrasonic receiver array of the device, the one or more generated ultrasonic signals comprises:
  converting the one or more generated ultrasonic signals to one or more pixels based at least in part on one or more pixel elements of the array of pixels elements,
  wherein generating the fingerprint image is further based at least in part on the converting.

8. The method of claim 1, wherein the one or more wavelengths are within one or more of a radio spectrum of an electromagnetic spectrum (EM) spectrum, a microwave spectrum of the EM spectrum, a near-infrared spectrum of the EM spectrum, an infrared spectrum of the EM spectrum, a visible spectrum of the EM spectrum, or an ultraviolet spectrum of the EM spectrum.

9. The method of claim 1, wherein:
  the ridges associated with the finger reflect the one or more generated ultrasonic signals; and
  the valleys associated with the finger absorb or alter the one or more generated ultrasonic signals.

10. The method of claim 1, wherein outputting the representation of the fingerprint image comprises:
  outputting, via the display interface of the device, the representation of the fingerprint image, wherein the display interface comprises an organic light emitting diode (OLED) display interface.

11. The method of claim 1, wherein the light emitting source comprises one or more of a light emitting diode (LED), a laser, or an organic light emitting diode (OLED) display interface.

12. The method of claim 1, wherein the one or more ultrasonic signals are generated by the one or more biological tissues within the finger based at least in part on the one or more pulses of electromagnetic radiation waves.

13. An apparatus for biometric imaging, comprising:
  a processor,
  memory coupled with the processor; and
  instructions stored in the memory and executable by the processor to cause the apparatus to:
    generate, via a light emitting source of the apparatus, one or more pulses of electromagnetic radiation waves, wherein the light emitting source is separate from a display interface of the apparatus;
    select a target depth level from a set of target depth levels associated with one or more biological tissues of a finger;
    select one or more wavelengths of the one or more pulses of electromagnetic radiation waves based at least in part on the selected target depth level associated with the one or more biological tissues of the finger to stimulate the one or more biological tissues of the finger to generate the one or more ultrasonic signals, wherein the selected one or more wavelengths correspond to the selected target depth level;
    emit, via the light emitting source, the one or more pulses of electromagnetic radiation waves, to generate one or more ultrasonic signals associated with one or more biological tissues of the finger, based at least in part on the one or more wavelengths;
    sense, via an ultrasonic receiver array of the apparatus, the one or more generated ultrasonic signals based at least in part on emitting the one or more pulses of electromagnetic radiation waves;
    generate a fingerprint image comprising at least one of ridges or valleys associated with the finger based at least in part on the sensing; and
    output a representation of the fingerprint image.

14. The apparatus of claim 13, wherein the instructions to emitting, via the light emitting source of the apparatus, the one or more pulses of electromagnetic radiation waves are executable by the processor to cause the apparatus to:
  emit the one or more pulses of electromagnetic radiation waves from the light emitting source of the apparatus that is external to a footprint of the display interface.

15. The apparatus of claim 13, wherein the instructions to emitting, via the light emitting source of the apparatus, the one or more pulses of electromagnetic radiation waves are executable by the processor to cause the apparatus to:
  emit the one or more pulses of electromagnetic radiation waves from the light emitting source that is external to a footprint of the apparatus.

16. The apparatus of claim 13, wherein the instructions to sensing, via the ultrasonic receiver array of the apparatus, the one or more generated ultrasonic signals are executable by the processor to cause the apparatus to:
  sense, via the ultrasonic receiver array of the apparatus, the one or more generated ultrasonic signals across one or more of an axial plane, a coronal plane, or a sagittal plane associated with the finger,
  wherein the fingerprint image comprises a tomographic fingerprint image based at least in part on sensing the one or more generated ultrasonic signals across one or more of the axial plane, the coronal plane, or the sagittal plane associated with the finger.

17. The apparatus of claim 13, wherein the instructions to sensing, via the ultrasonic receiver array of the apparatus, the one or more generated ultrasonic signals are executable by the processor to cause the apparatus to:
  sense, via a piezoelectric micromachined ultrasonic transducer (PMUT) or a capacitive micromachined ultrasonic transducer (CMUT) of the apparatus, the one or more generated ultrasonic signals.

18. The apparatus of claim 13, wherein the ultrasonic receiver array of the apparatus comprises an array of pixel elements, and comprises:
  convert the one or more generated ultrasonic signals to one or more pixels based at least in part on one or more pixel elements of the array of pixels elements,
  wherein generating the fingerprint image is further based at least in part on the converting.

19. An apparatus for biometric imaging, comprising:
  means for generating, via a light emitting source of the apparatus, one or more pulses of electromagnetic radiation waves, wherein the light emitting source is separate from a display interface of the apparatus;
  means for selecting a target depth level from a set of target depth levels associated with one or more biological tissues of a finger;
  means for selecting one or more wavelengths of the one or more pulses of electromagnetic radiation waves based at least in part on the selected target depth level associated with the one or more biological tissues of the finger to stimulate the one or more biological tissues of the finger to generate the one or more ultrasonic signals, wherein the selected one or more wavelengths correspond to the selected target depth level;
  means for emitting, via the light emitting source, the one or more pulses of electromagnetic radiation waves, to generate one or more ultrasonic signals associated with one or more biological tissues of the finger, based at least in part on the one or more wavelengths;

means for sensing, via an ultrasonic receiver array of the apparatus, the one or more generated ultrasonic signals based at least in part on emitting the one or more pulses of electromagnetic radiation waves;

means for generating a fingerprint image comprising at least one of ridges or valleys associated with the finger based at least in part on the sensing; and means for outputting a representation of the fingerprint image.

* * * * *